United States Patent
Devarajan et al.

(10) Patent No.: US 7,167,904 B1
(45) Date of Patent: Jan. 23, 2007

(54) UNIFIED WEB-BASED INTERFACE-TO MULTIPLE REGISTRAR SYSTEMS

(75) Inventors: Manivannan Devarajan, Reston, VA (US); Greg Korzeniewski, Falls Church, VA (US); Vincent M. Lee, Ashburn, VA (US)

(73) Assignee: Network Solutions, LLC, Herndon, VA (US)

( * ) Notice: Subject to any disclaimer, the term of this patent is extended or adjusted under 35 U.S.C. 154(b) by 673 days.

(21) Appl. No.: 09/526,735

(22) Filed: Mar. 16, 2000

Related U.S. Application Data

(60) Provisional application No. 60/125,107, filed on Mar. 19, 1999.

(51) Int. Cl.
G06F 15/16 (2006.01)
(52) U.S. Cl. ...................... 709/218; 709/245
(58) Field of Classification Search ........ 709/201–202, 709/219, 226, 223, 225, 229, 247, 205, 218, 709/245; 705/5–6; 707/103
See application file for complete search history.

(56) References Cited

U.S. PATENT DOCUMENTS

| | | | | |
|---|---|---|---|---|
| 5,881,131 A | * | 3/1999 | Farris et al. ............. | 379/15.03 |
| 5,903,721 A | * | 5/1999 | Sixtus ........................ | 713/201 |
| 5,905,862 A | * | 5/1999 | Hoekstra .................... | 709/202 |
| 6,104,711 A | * | 8/2000 | Voit ........................... | 370/352 |
| 6,134,592 A | * | 10/2000 | Montulli .................... | 709/229 |

(Continued)

OTHER PUBLICATIONS

Galkin, W., "Names on the Net, e-mail in court, and trade secrets for hire", Jan. 1996, Computer, vol. 29, Issue 1, pp. 110-111.*

(Continued)

*Primary Examiner*—Andrew Caldwell
*Assistant Examiner*—Douglas Blair
(74) *Attorney, Agent, or Firm*—Kenyon & Kenyon LLP

(57) ABSTRACT

An apparatus and method for interfacing multiple registrar systems are presented. A first registrar system is operable to book a domain name for a customer in a first manner. A second registrar system is operable to book a domain name for a customer in a second manner different than the first manner. A means for interfacing the first registrar system and the second registrar system is provided such that the first registrar system and the second registrar system are accessible from a single web site.

11 Claims, 8 Drawing Sheets

U.S. PATENT DOCUMENTS

| | | | |
|---|---|---|---|
| 6,195,691 B1 * | 2/2001 | Brown | 709/219 |
| 6,298,341 B1 * | 10/2001 | Mann et al. | 707/3 |
| 6,298,383 B1 * | 10/2001 | Gutman et al. | 709/229 |
| 6,360,254 B1 * | 3/2002 | Linden et al. | 709/219 |
| 6,374,295 B2 * | 4/2002 | Farrow et al. | 709/223 |
| 6,438,584 B1 * | 8/2002 | Powers | 709/206 |
| 6,496,855 B1 * | 12/2002 | Hunt et al. | 709/217 |
| 6,560,634 B1 * | 5/2003 | Broadhurst | 709/203 |
| 6,564,216 B2 * | 5/2003 | Waters | 707/10 |
| 6,678,717 B1 * | 1/2004 | Schneider | 709/203 |
| 6,834,302 B1 * | 12/2004 | Harvell | 709/224 |
| 6,980,990 B2 * | 12/2005 | Fellman | 707/10 |
| 7,000,028 B1 * | 2/2006 | Broadhurst et al. | 709/245 |
| 7,020,602 B1 * | 3/2006 | Kim et al. | 704/8 |
| 7,039,697 B2 * | 5/2006 | Bayles | 709/223 |
| 7,076,476 B2 * | 7/2006 | Judd et al. | 707/1 |

OTHER PUBLICATIONS

Gannoun et al., "Mobile agent-based shared registry system for electronic commerce of Internet domain names", Nov. 1999, IEEE workshop on Mobile Multimedia Communications, 1999, pp. 169-178.*

Lewis, T., "A Rose By Any Other (Domain) Name [Wired Wired World]", Apr. 1998, Internet Computing, IEEE, vol. 2, Issue 2, pp. 8-11.*

Foster et al. "Who Governs the Internet?", Aug. 1997, Communications of the ACM, vol. 40, Issue 8.*

* cited by examiner

UNIFIED WEB-BASED INTERFACE-TO MULTIPLE REGISTRAR SYSTEMS

RELATED APPLICATION

This application claims the benefit of U.S. Provisional Application No. 60/125,107, filed Mar. 19, 1999, the disclosure of which is expressly incorporated herein by reference in its entirety.

FIELD OF THE INVENTION

The present invention relates to the field of domain name registration. More particularly, the invention relates to an apparatus and method for accessing multiple registrar systems from a single point.

BACKGROUND OF THE INVENTION

Registration of a domain name enables an individual or organization to use that particular domain name for a specified period of time, provided certain conditions are met and payment for services is made. The individual or organization to whom a specific domain name is registered is called the registrant and holds the right to use that specific domain name for a specified period of time. When a potential registrant initially desires to register a domain name, the registrant needs to choose a registrar system to handle the registration.

Different registrar systems often utilize different methods of processing registration requests. In the past, it has been necessary to access different web sites in order to use the different registrar systems. This use of different web sites is costly and makes it difficult for a domain name registration service that maintains both web sites to efficiently conduct business with customers.

Accordingly, there is presently a need for a unified web-based interface for multiple registrar systems.

SUMMARY OF THE INVENTION

An apparatus consistent with the present invention provides for interfacing multiple registrar systems. The apparatus includes: a first registrar system operable to book a domain name for a customer in a first manner; a second registrar system operable to book a domain name for a customer in a second manner different than the first manner; and means for interfacing the first registrar system and the second registrar system, the means for interfacing enabling a customer to access the first registrar system and the second registrar system from a single web site.

Another apparatus consistent with the present invention provides for interfacing multiple registrar systems. The apparatus includes: a first registrar system operable to book a domain name for a customer using an electronic mail interface; a second registrar system operable to book a domain name for a customer using a web-based interface; and means for interfacing the first registrar system and the second registrar system, the means for interfacing enabling a customer to access the first registrar system and the second registrar system from a single web page.

A method consistent with the present invention provides for interfacing multiple registrar systems. The method includes the steps of: receiving a domain name from a customer; determining whether the domain name is available for booking; selecting a registrar system from a first registrar system and a second registrar system to book the domain name based on a determination that the domain name is available for booking, the first registrar system operable to book the domain name using an electronic mail interface, and the second registrar system operable to book the domain name using a web-based interface; and booking the domain name using the selected registrar system.

Another method consistent with the present invention provides for interfacing multiple registrar systems. The method includes the steps of: receiving a domain name from a customer; checking a flag associated with the domain name; directing the customer to a first web page based on a determination that the flag indicates that the domain name is booked using a first registrar system; and directing the customer to a second web page based on a determination that the flag indicates that the domain name is booked using a second registrar system, wherein the first registrar system is operable to book a domain name using an electronic mail interface, and the second registrar system is operable to book the domain name using a web-based interface.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

The unified web-based interface of the present invention allows a domain name registration service to present a unified front end for multiple registrar systems under its control. The previously existing web sites of the multiple registrar systems point to a new web site. This new site makes it easier for customers to do business with the domain name registration service. The unified web-based interface, for example, enables customers to access an electronic mail template-based registrar system and a web-based registrar system from the same web page.

System Architecture

Figure 1:
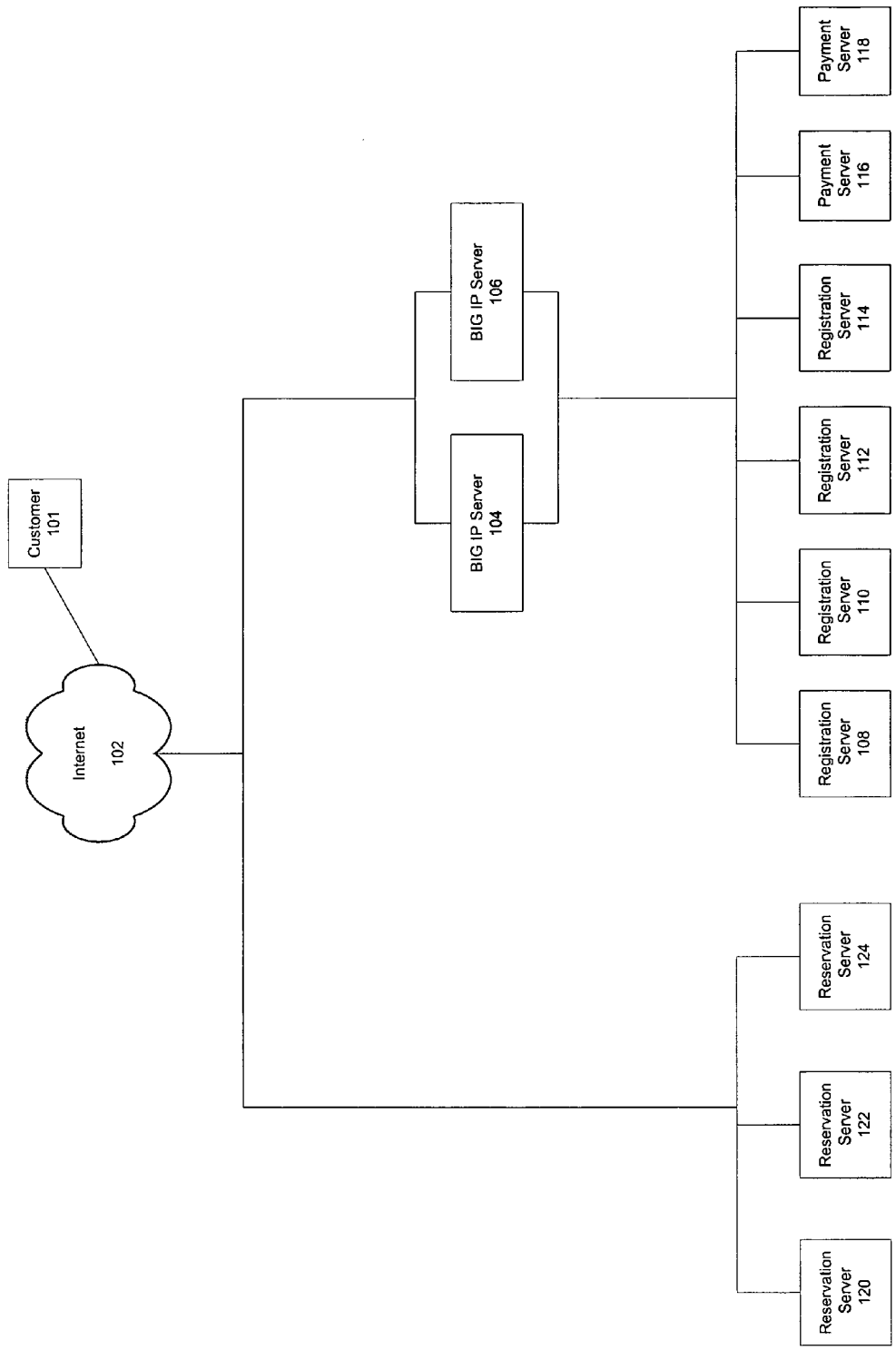
FIG. 1 is a diagram of an exemplary network environment in which a technique consistent with the present invention may be implemented.

FIG. 1 is a diagram of an exemplary network environment 100 in which methods consistent with the present invention may be implemented. Network environment 100 includes: customer 101; Internet 102; BIGIP servers 104 and 106; registration servers 108, 110, 112, and 114; payment servers 116 and 118; and reservation servers 120, 122, and 124.

Customer 101 is an individual or organization that desires to book a domain name with a domain name registration service. The term "book" or "booking" herein broadly refers to the general act of registering a domain name, which may include both the registration and reservation of domain names. In the embodiment of FIG. 1, a single domain name registration service owns and maintains each of the various servers, e.g., BIGIP servers 104 and 106; registration servers 108, 110, 112, and 114; payment servers 116 and 118; and reservation servers 120, 122, and 124.

When customer 101 attempts to access the domain name registration service through Internet 102, communications are routed to either BIGIP server 104 or 106. BIGIP servers 104 and 106 are redundant servers that essentially direct traffic to and from registration servers 108, 110, 112, and 144, and to and from payment servers 116 and 118. For example, a customer, such as customer 101, that attempts to access the domain name registration service is initially directed to BIGIP server 104 or to BIG IP server 106 if BIGIP server 104 is busy or not functioning properly. In turn, BIGIP server 104 or 106 may direct communications to one of registration servers 108, 110, 112, and 114, or payment servers 116 and 118.

Essentially, BIG IP servers 104 and 106 balance the load between the attached servers. For example, BIG IP servers 104 and 106 may alternate between servers when directing the communications. If one server is too busy, then data can be sent to another server. In this manner, bottlenecking of data can be avoided. In one embodiment, DNS (Domain Name Service) round robin may be used for load balancing. It should be understood that the number of servers connected to BIG IP servers 104 and 106 can be expanded as needed. If web traffic goes over a desired limit, more hosts can be added to stop congestion. BIG IP servers 104 and 106 may be implemented, for example, using SunServer machines available from Sun Microsystems.

Registration servers 108, 110, 112, and 114, and payment servers 116 and 118 constitute the main servers for a registrar system that utilizes a first type of system for booking domain names. In one embodiment, the first type of system for booking domain names includes an e-mail template-based system. In this embodiment, the term "registration" refers to booking that uses the e-mail template-based registrar system. For example, registration servers 108, 110, 112, and 114 may implement a process that handles all registrations for customers that desire to have their domain name registered, while payments servers 116 and 118 may implement a process that handles all customer payments for registering domain names and other available services. Registration servers 108, 110, 112, and 114, and payment servers 116 and 118 may each be implemented using, for example, a SunServer machine available from Sun Microsystems running NSCA web server.

Registration servers 108, 110, 112, and 114 also serve as the initial contact point for customers no matter what type of registrar system is desired. For example, even if customer 101 wants to use the registrar system that is managed by reservation servers 120, 122, and 124, customer 101 is still initially directed to one of registration server 108, 110, 112, and 114. Once access to the registration server has been made, customer 101 is presented with a consolidated web page or site that includes the options of both domain name registration and domain name reservation. Domain name reservation refers to a booking that uses a web-based system, as opposed to an e-mail template-based system. The web page may be implemented with a hypertext markup language (HTML) file that is resident at each of registration server 108, 110, 112, and 114. Alternatively, each registration server may access the html file from shared storage. Other options presented to customer 101 upon initial access may include e-mail purchase, account management, and whois.

Reservation servers 120, 122, and 124 constitute the main servers for a registrar system that utilizes a second type of system for booking domain names. In one embodiment, the second type of system for booking domain names includes a web-based system. This registrar system may be used to reserve domain names once a customer has chosen the domain name reservation option using the web page resident on one of registration server 108, 110, 112, and 114. For example, a selection of the domain name reservation option results in the customer being redirected to one of reservation server 120, 122, and 124, where a process handles all domain name reservations. Reservation servers 120, 122, and 124 may be load balanced in a manner similar to that described for registration servers 108, 110, 112, and 114. Registration servers 108, 110, 112, and 114 may each be implemented using, for example, a SunServer machine available from Sun Microsystems running Apache Stronghold.

Figure 2:
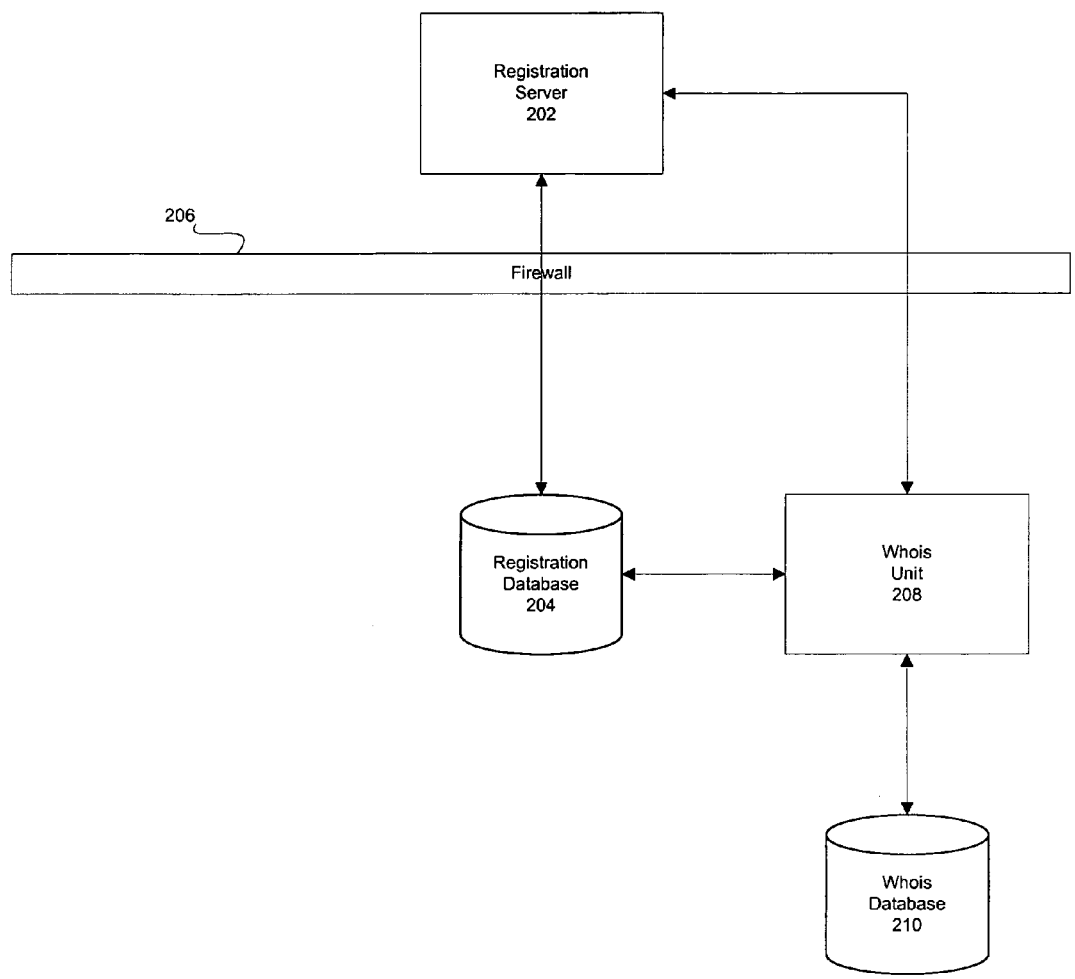
FIG. 2 is a diagram of an exemplary environment for registering a domain name consistent with the present invention.

FIG. 2 is a diagram of an exemplary e-mail template-based registrar system for registering a domain name consistent with the present invention. Registration server 202 corresponds to any of registration servers 108, 110, 112, and 114 of FIG. 1. After a customer has decided to register a domain name using the e-mail template-based registrar system, registration server 202 presents the customer with a series of screens asking for certain information from the customer. This information may include the customer's e-mail address, customer information, contact information, and name server information. After the customer has entered the relevant information and submitted it, registration server 202 e-mails a template containing the information to the customer at the aforementioned e-mail address. The customer must verify the information included in the template before e-mailing the template back to registration server 202. Only after the template is e-mailed back to registration server 202 will the request for registration be processed. Registration server 202 sends the template to registration database 204 for storage through firewall 206, after it has been determined that registration may proceed. An employee of the domain name registration service may be partially responsible for such a determination.

Registration database 204 functions as the main database for the e-mail template-based registrar system and stores information related to the registration of a domain name. For example, the template that includes the information provided by the customer may be stored in registration database 204 after it has been determined that the desired domain name does not already exist in the database. Registration database 204 periodically attempts to move its data to a registry system (not shown) so that new domain names may be officially reserved. A registry is responsible for delegating Internet addresses, such as Internet Protocol (IP) numbers and domain names, and keeping a record of those addresses and the information associated with their delegation. Examples of domain name registries include NSI's registry operation (e.g., .com, .net, and .org) and the ISO 3166 country code registries (e.g., fr, de, uk, us). If a domain name that originates from registration database 204 is already stored in the registry, then the domain name is not valid. This may happen if a customer from a different domain name registration service had previously registered the domain name.

Whois unit 208 periodically causes registration database 204 to transfer some of its data to whois database 210. The data that is periodically transferred to whois database 210 is data that is commonly needed to properly perform whois operations. Whois database 210 may be a searchable database that includes information about networks, networking organizations, domain names, and the contacts associated with them.

Figure 3:
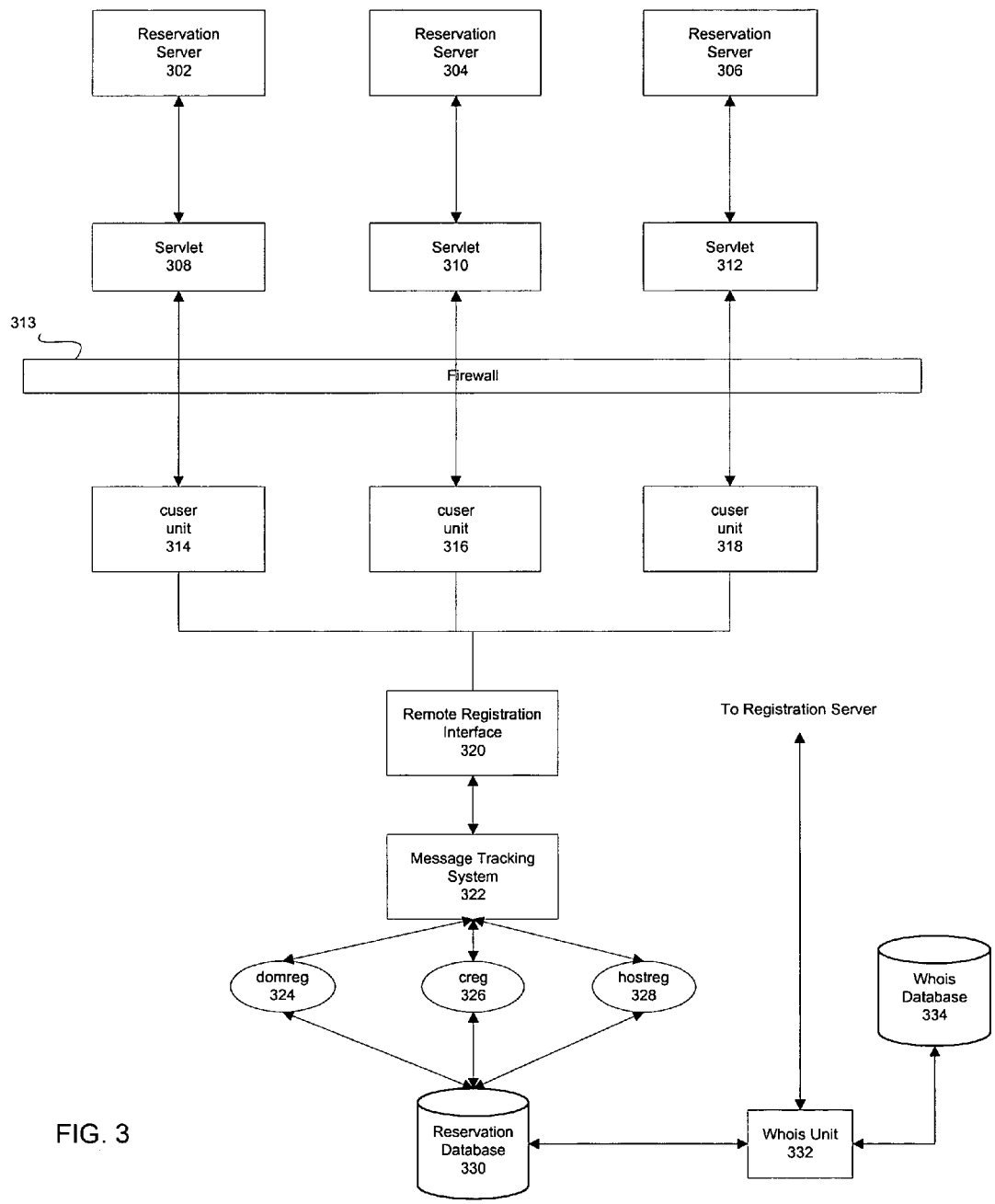
FIG. 3 is a diagram of an exemplary environment for reserving a domain name consistent with the present invention.

FIG. 3 is a diagram of an exemplary web-based registrar system for reserving a domain name consistent with the present invention. Reservation servers 302, 304, and 306 correspond to reservation servers 120, 122, and 124 of FIG. 1. Servlets 308, 310, and 312 are programs that may be running on reservation servers 302, 304, and 306, respectively. Alternatively, servlets 308, 310, and 312 may run on machines other than reservation servers 302, 304, and 306. Servlets 308, 310, and 312 each operate in substantially the same manner and a description involving one of them applies to all of them. Servlet 308 accepts input data from a customer attempting to reserve a domain name using the web-based registrar system. The input data from the customer includes all of the information needed from the customer by the registrar system to reserve a domain name. This information may include, for example, information identifying the domain names that are desired to be reserved, information identifying the customer, payment information, etc. After receiving this input data, servlet 308 sends a request including the input N, data to cuser unit 314 through firewall 313.

Cuser unit 314 functions to receive a request to reserve a domain name from servlet 308 and then creates an entry in a primary and secondary name server for that domain name. Because in this embodiment the domain name registration service that provides the web-based registrar system also provides the primary and secondary name servers, the customer does not need to supply the system information identifying name servers. Cuser unit 314 performs load balancing to determine which name server should be designated as the primary name server and which name server should be designated the secondary name server. After creating the entry, cuser unit 314 passes the request to remote registration interface 320.

In one embodiment, each of cuser units 314, 316, and 318 operate in substantially the same manner and may be implemented using Sun workstations. Remote registration interface 320 functions to receive the request from one of the cuser units and places the information from the request into a template, thereby placing the information into a proper format for reserving a domain name. Once remote registration interface 320 puts the information into a template, it passes the template to message tracking system 322.

Message tracking system 322 receives templates from remote registration interface 320 and attempts to verify the information in the template. In this manner, the customer no longer needs to examine the information in a template and e-mail it to the registrar system. After verifying the template information, message tracking system 322 invokes domreg 324, creg 326, and hostreg 328 programs, which complete the reservation.

In one embodiment, domreg 324, creg 326, and hostreg 328 all reside on message tracking system 322. Domreg 324 essentially reserves the domain name and populates the N, various databases with the relevant information from the template. For example, upon being invoked by message tracking system 322 and receiving the template, domreg 324 may store domain name information from the template in reservation database 330. This storage may occur after domreg 324 checks reservation database 330 for already existing entries with the desired domain name. Creg 326 performs a similar function for customer contact information that is part of a template. Hostreg 328 performs a similar function for host name registrations.

Reservation database 330 functions as the main database for the web-based registrar system and stores information related to the reservation of a domain name. For example, the template that includes all of the information provided by the customer may be stored in reservation database 330 after it has been determined that the desired domain name does not already exist in the database. Reservation database 330 periodically attempts to move its data to a registry so that new domain names may be officially reserved. If a domain name that originates from reservation database 330 is already stored in the registry, then the domain name is not valid.

Whois unit 332 and whois database 334 are the same whois unit 208 and whois database 210 of FIG. 2. Whois unit 332 periodically causes reservation database 330 to transfer some of its data to whois database 334. The data that is periodically transferred to whois database 334 is data that is commonly needed to properly perform whois operations.

Unified Interface

Figure 4:
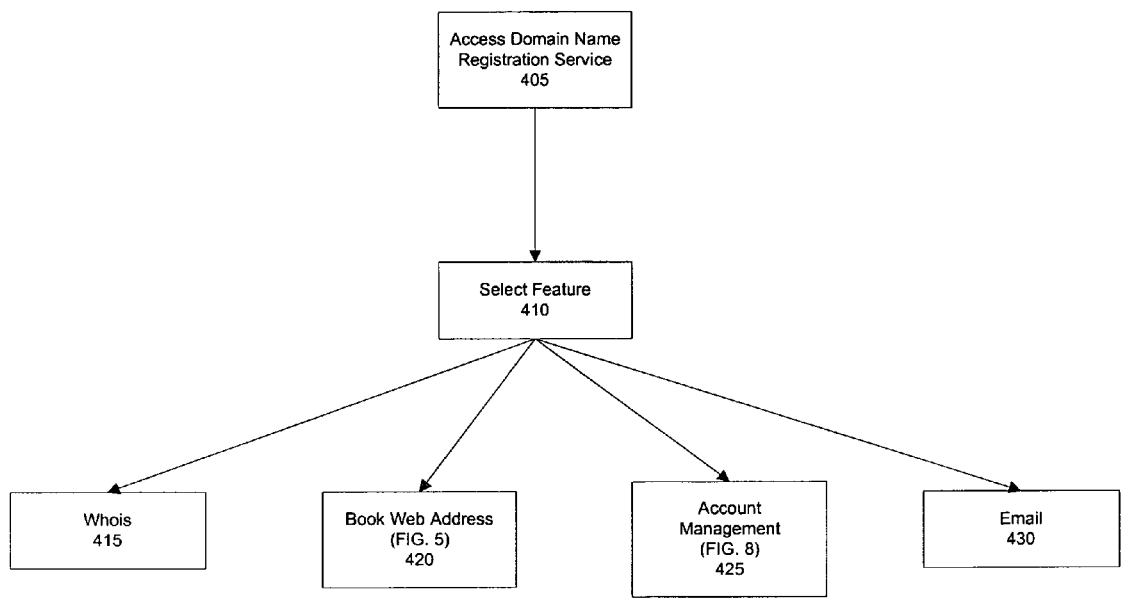
FIG. 4 is an exemplary flowchart of a process for choosing a feature of a domain name registration service in a manner consistent with the present invention.

FIG. 4 is an exemplary flowchart of a process for choosing a feature of a domain name registration service in a manner consistent with the present invention. Initially, a customer accesses the home page of a domain name registration service, such as the one offered by Network Solutions, Inc. (step 405). Access can be gained, for example, by using a web browser N, to access the home page. This web page is essentially a unified interface for many of the features available from the domain name registration service including the multiple registrar systems and is resident on each of the registration servers 108, 110, 112, and 114. The page makes it easier for customers to do business with the domain name registration service by enabling the customers to access the various features from a single web page. Alternatively, the unified interface could be presented to the customer in the form of more than one web page. In this case, efficient business from customers is still facilitated because the multiple web pages are each linked to one initial home page and are part of the same web site. Furthermore, the unified interface does not need to be the home page of the domain name registration service. It can merely be a web page that can be accessed from the home page.

Once the customer accesses the web page, the customer is presented with several features that the domain name registration service provides. The customer must then choose one of the features (step 410). The features may include a whois feature, a book web address feature, an account management feature, and an email feature. If the customer chooses the whois feature, then the unified interface directs the customer to a web page where a whois search or operation may be properly processed (step 415). If the customer chooses the email feature, then the unified interface directs the customer to a web page where an optional email service offered by the domain name registration service may be purchased by the customer (step 430). If the customer chooses the book web address feature, then the unified interface initiates the book web address feature (step 420). The term "booking a web address" covers both registering and reserving a web address (e.g., domain name). In one embodiment, the book web address feature is initiated by the customer entering a desired domain name in a box on the unified interface web page. If N, the customer chooses the account management feature, then the unified interface directs the customer to a proper account management page (step 425). It should be understood that many more features than those discussed above may be made available to the customer.

Figure 5:
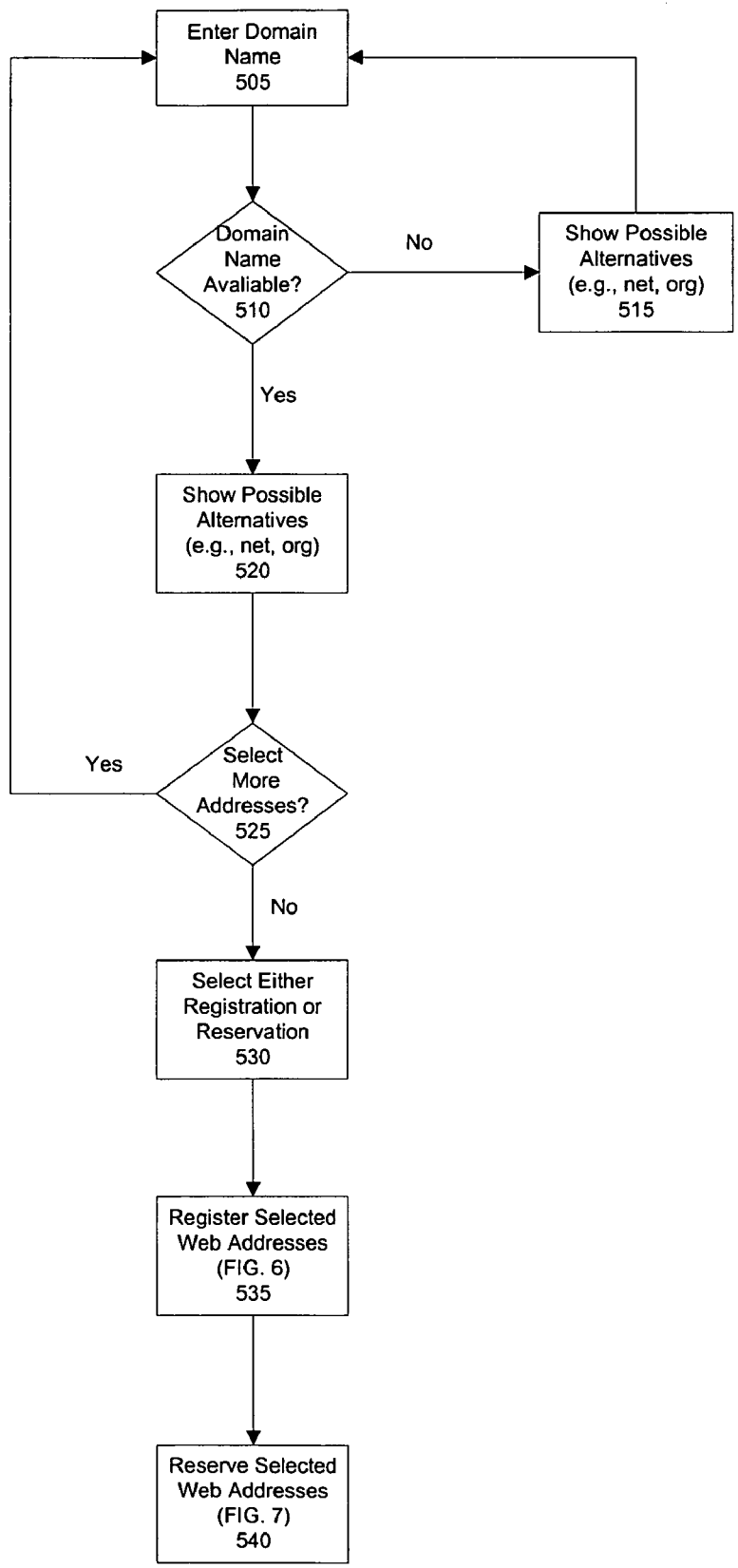
FIG. 5 is an exemplary flowchart of an initial process for booking a web address in a manner consistent with the present invention.

FIG. 5 is an exemplary flowchart of an initial process for booking (e.g., registering or reserving) a web address in a manner consistent with the present invention. To initiate the booking process, the customer enters the desired domain name in a box on the unified interface web page (step 505). Upon receiving the domain name, the unified interface initiates a whois-based query to check for domain availability (step 510). The whois-based query provides a search of the whois database for an entry with the entered domain name. If such an entry is found, then the domain name is not available. If no such entry is found, then the domain name is available. If the whois-based query results in the determination that the desired domain name is not available, then the unified interface informs the customer that the domain name is not available and shows the customer some possible alternatives to the domain name initially selected (step 515). For example, if a customer desired to book a domain name of "mydomain.com", but the domain name was not available, the unified interface makes a determination as to whether or not "mydomain.net" or "mydomain.org" were available. If either one of these domain names is available, then the unified interface informs the customer of the available alternatives. Note that other top-level domains in addition to ".com", ".net", and ".org" may be searched for both initially and as alternatives. The unified interface may direct the customer to enter or select another domain name after showing the customer the alternatives.

If the whois-based query results in the determination that the desired domain name is available, then the unified interface informs the customer that the domain name is available and may show the customer some possible alternatives in addition to the domain name initially selected (step 520). For example, if a customer desires to book a domain name of "mydomain.com", and the domain name is available, the unified interface may also make a determination as to whether or not "mydomain.net" or "mydomain.org" are available.

After learning that the desired domain name is available, the customer may choose to enter more domain names to check for availability (step 525). If the customer decides to include an additional name, then that name is checked for availability in a manner consistent with the whois-based query described above. In one embodiment, the customer may choose up to nine additional domain names for a total of ten. In this manner, a virtual shopping cart of up to ten domain names may be created. It should be understood that the maximum number of domain names may be altered. Each time the customer selects a domain name and that name is available, the unified interface may show all of the available domain names that have been selected by the customer in the present session along with a sum of the charges, including both the reservation and registration prices.

If the customer decides not to include any more additional names, then the unified interface provides the customer with an option to book the domain names with either a registration process or a reservation process (step 530). The first type of registrar system (e.g., e-mail template-based registrar system) carries out registration, and the second type of registrar system (e.g., web-based registrar system) carries out reservation. In one embodiment, the unified interface allows the customer to decide how each individual domain name should be booked. For example, if a customer has ten domain names to be booked, the customer may decide to register three of them and reserve seven of them. After the customer has designated how each domain name should be booked, the unified interface provides the customer with an updated sum of charges and initiates the register web address process to register each of the domain names that the customer designated to be registered (step 535). After each registration is completed, the unified interface initiates the reserve web address process to reserve each of the domain names that the customer designated to be reserved (step 540). Alternatively, the unified interface may opt to reserve domain names before registering domain names.

Domain Name Registration

Figure 6:
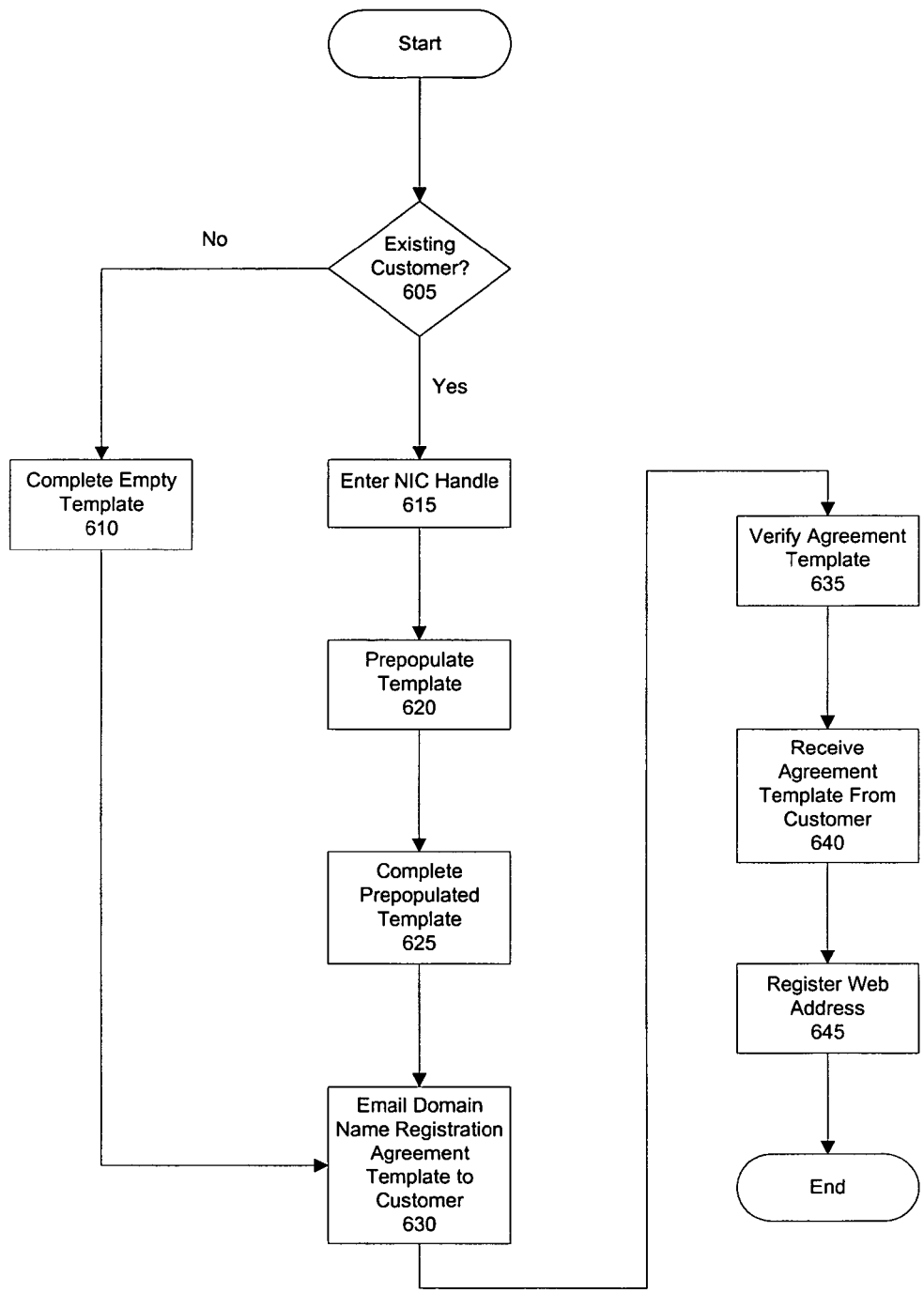
FIG. 6 is an exemplary flowchart of a process for registering a web address in a manner consistent with the present invention.

FIG. 6 is an exemplary flowchart of a process for registering a web address (e.g., domain name) in a manner consistent with the present invention. After the customer has selected registration, the registration server directs the customer to a page that asks whether or not the customer is an existing customer (step 605). If the customer is an existing customer, the customer enters a NIC handle (step 615), which is a unique identifier assigned to each domain name record, contact record, network record, etc. Upon receiving the NIC handle, the registration server retrieves information associated with the NIC handle and prepopulates a domain name registration agreement template with the relevant information (step 620). For example, the following information may be prepopulated into the template: registrant (organization or individual) information, administrative contact information, technical contact information, and billing contact information. Registrant information may include information such as name, street address, city, state, etc. Administrative contact information may include information, such as name, street address, state, phone number, e-mail, etc. Technical contact information may include information, such as name, street address, state, phone number, e-mail, etc. Billing contact information may include information, such as name, street address, state, phone number, e-mail, etc.

After the information has been entered, the registration server then presents the prepopulated template to the customer. Some of the template fields, however, may still need to be completed by the customer (step 625). These fields may include the e-mail address of the customer and name server information. The e-mail address of the customer may be vital because the completed template needs to be e-mailed to the customer and returned before registration can be completed. Name server information includes at least a primary server host name, a primary server IP address, a secondary server host name, and a secondary server IP address. The customer may provide host names and IP addresses for more servers, but they are not absolutely necessary. The primary and secondary servers are servers hosted by the ISP or web hosting company with whom the customer has made previous arrangements.

If the customer is not an existing customer, the customer must complete an empty template (e.g., template without the aforementioned prepopulated information). In this case, the customer must provide registrant information, administrative contact information, technical contact information, billing contact information, customer e-mail address, and name server information (step 610).

After the empty template or prepopulated template has been completed, the customer is presented with a summary of the cost, instructed to provide information on method of payment (e.g., invoice or credit card), and required to accept a legal agreement between the customer and the domain name registration service. The completed template is then e-mailed to the customer at the customer's e-mail address (step 630). The customer, having received the template via e-mail, verifies the information that is provided in the template (step 635), and then e-mails the N, template back to the registration server. Once the registration server receives the template (step 640), the registration server e-mails a tracking number back to the customer. This tracking number is the NIC handle that may be used in future dealings with the domain name registration service. Employees of the domain name registration service may also process the template to ensure that it is complete and correctly formatted, etc. The registration server next registers the web address (e.g., domain name) by storing the domain name(s) in registration database 204 and attempting to move the domain name from registration database 204 to the registry (step 645). Registration occurs, for example, n the manner described with reference to FIG. 3 above. The registration server informs the customer as to the success or failure of the registration.

Domain Name Reservation

Figure 7:
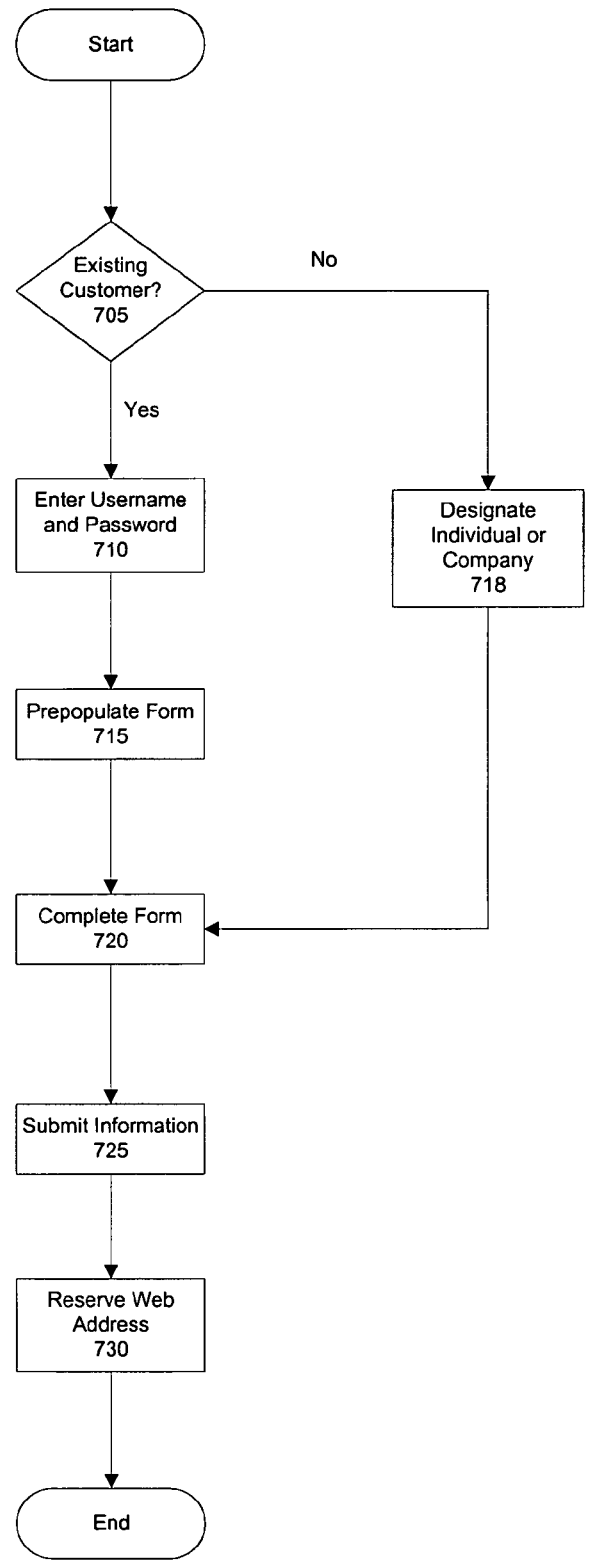
FIG. 7 is an exemplary flowchart of a process for reserving a web address in a manner consistent with the present invention.

FIG. 7 is an exemplary flowchart of a process for reserving a web address in a manner consistent with the present invention. After the customer has selected reservation, the registration server redirects the customer to reservation server 120, 122, or 124, where the customer is directed to a page that asks whether or not the customer is an existing customer (step 705). If the customer is an existing customer, then the customer enters a username and a password (step 710), resulting in the prepopulation of the form that is required to be completed by the customer (step 715). Information that may be prepopulated into the form includes account holder information, contact information, and account password information. Account holder and contact information may both include information, such as name, street address, state, e-mail address, phone number, etc. Account password information may include information, such as the customer's password and a question to the customer in case the password is forgotten. After the form has been prepopulated, the customer may still have to complete a portion of the form (step 720). For example, the domain name registration service may make certain options available to a customer choosing reservation, and the customer designates whether or not those options are desired.

If the customer is not an existing customer, then the customer designates whether he or she is reserving a domain name for a company or for an individual (step 718). After this designation, the customer completes the form in its entirety, including the account holder information, the contact information, the password information, and the information indicative of the options chosen (step 720).

After the empty form or prepopulated form has been completed, the customer submits the completed form to the reservation server by clicking on a button on a web page (step 725). The reservation server then presents the customer with a summary of the cost, requests credit card information from the customer, and requires the customer to accept a legal agreement between the customer and the domain name registration service. Once the legal agreement has been accepted, the registration server proceeds to initiate the reservation process by sending the form from the servlet running on the reservation server to a cuser unit (step 730). This process occurs, for example, in the manner described with reference to FIG. 3 above. The reservation server informs the customer as to the success or failure of the reservation.

Account Management

Figure 8:
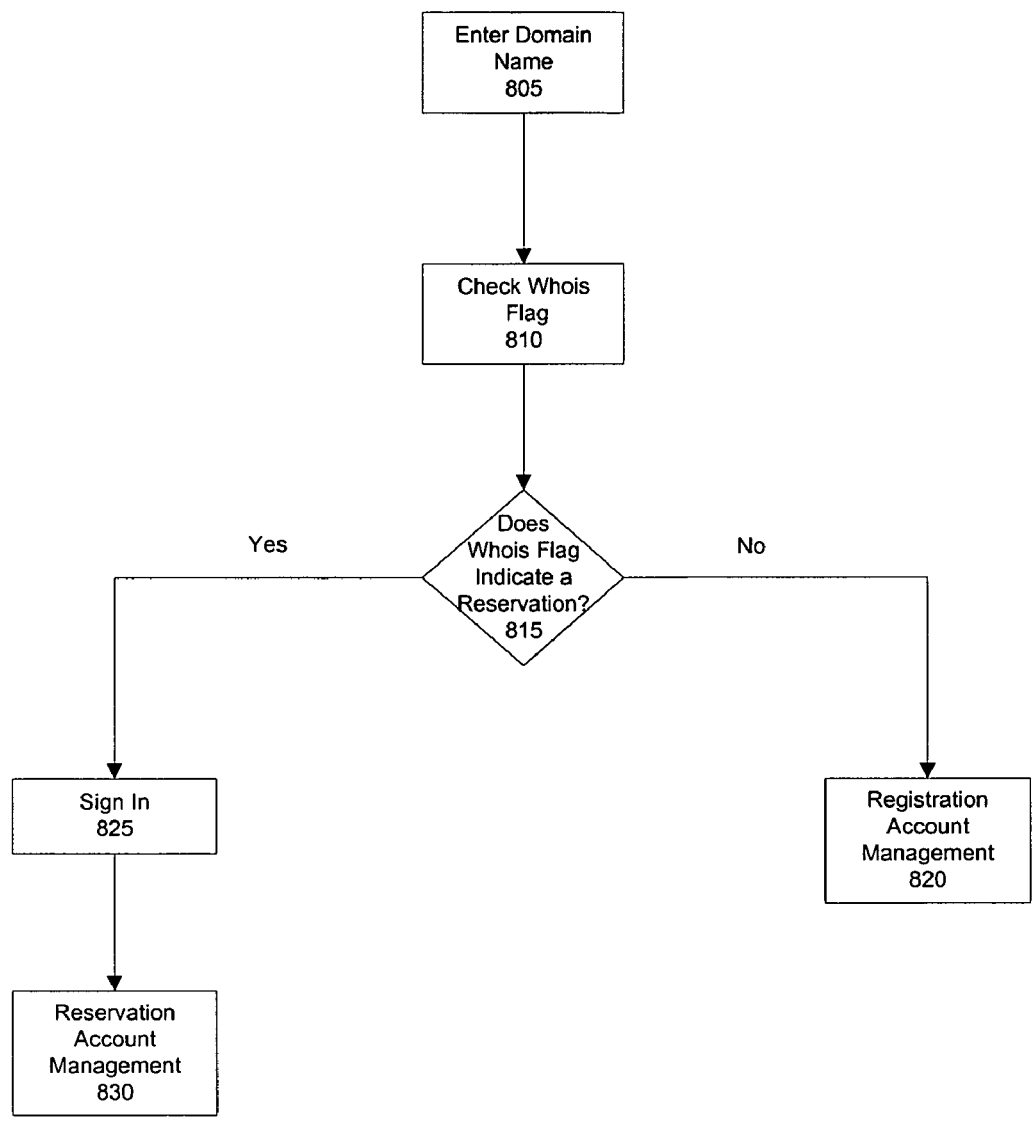
FIG. 8 is an exemplary flowchart of a process for managing an account in a manner consistent with the present invention.

FIG. 8 is an exemplary flowchart of a process for managing an account in a manner consistent with the present invention. Account management is used when an existing customer desires to perform operations other than domain name booking (e.g., registration or reservation). Such operations may include domain modifications as well as contact and host registrations. For example, a customer that desires to replace an existing contact with a new contact, change ISP or web host company name server information, correct misspellings in the name of the registrant, or transfer a domain name registration to another registrant may do so using account management.

Account management is initiated by the customer from the home page of the domain name registration service (e.g., the unified interface web page) by clicking on the appropriate button. The registration server then directs the customer to a page where the customer is asked to enter the domain name for which account management is desired (step 805). Upon receiving the domain name from the customer, the registration server initiates a whois search for a flag designating whether the customer is a registration customer or a reservation customer (step 810). Specifically, the registration server searches the whois database for a flag associated with the record for the entered domain name. In one embodiment, the flag may include something very inconspicuous, such as a period.

After checking the whois flag for the domain name, a determination is made as to whether the flag indicates that the domain name was reserved, as opposed to registered (step 815). If the flag indicates reservation, then the registration server redirects the customer to a web page resident on a reservation server, where the customer is instructed to sign-in (e.g., enter a username and password) (step 825). After the customer's username and password are verified, the reservation server directs the customer to the reservation account management page (step 830), where the customer may perform any of the account management options available. If the flag indicates registration, then the registration server directs the customer to a registration account management web page resident on the registration server (step 820), where the customer may perform the appropriate account management functions.

While the present invention has been described in connection with a preferred embodiment, many modifications will be readily apparent to those skilled in the art, and this application is intended to cover any adaptations or variations thereof. One skilled in the art will appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. This invention should be limited only by the claims and equivalents thereof.

What is claimed is:

1. A method for booking domain names, comprising:
in response to receiving at least one domain name from a customer, determining whether the domain name is available;
if the domain name is available, presenting an option to book the domain name to the customer, the option to book the domain name including an option to reserve the domain name and an option to register the domain name;
in response to receiving a domain name reservation request from the customer, prompting the customer for a username and a password;
in response to receiving the username and the password from the customer, presenting a domain name reservation form to the customer;
in response to receiving a completed domain name reservation form from the customer, presenting a cost summary, a request for payment and a legal agreement to the customer;
in response to receiving payment information and an acceptance of the legal agreement from the customer, reserving the domain name.

2. The method of claim 1, wherein the domain name reservation form includes account holder information, contact information and account password information.

3. The method of claim 1, further comprising:
in response to receiving a domain name registration request from the customer, prompting the customer for an NIC handle,
in response to receiving the NIC handle from the customer, presenting a domain name registration agreement template to the customer;
in response to receiving a completed domain name registration agreement from the customer, presenting a cost summary, a request for payment and a legal agreement to the customer;
in response to receiving payment information and an acceptance of the legal agreement from the customer, sending a first electronic mail message, including the completed domain name registration agreement, to the customer; and
in response to receiving a second electronic mail message, including a verified domain name registration agreement, from the customer, registering the domain name.

4. The method of claim 3, wherein the domain name registration agreement template includes registrant information, administrative contact information, technical contact information and billing contact information.

5. The method of claim 4, wherein the completed domain name registration agreement includes a customer electronic mail address and name server information.

6. The method of claim 1, further comprising:
in response to receiving the domain name from the customer, determining at least one alternative domain name based on the domain name;
presenting the alternative domain name to the customer; and
receiving the alternative domain name from the customer for booking.

7. A system for booking domain names over a network, comprising:
at least one load balancing server, coupled to the network, adaptively configured to:
receive a booking request, including at least one domain name, from a customer;
a plurality of registration servers, coupled to the network, the load balancing server and a registration database, each of the plurality of registration servers adaptively configured to:
receive the booking request forwarded from the load balancing server,
determine whether the domain name is available,
if so determined, present an option to book the domain name to the customer, the option to book the domain name including an option to reserve the domain name and an option to register the domain name, and
receive a domain name reservation request from the customer; and
a plurality of reservation servers, coupled to the network, the load balancing server and a reservation database, each of the plurality of reservation servers adaptively configured to:
receive the domain name reservation request forwarded from one of the plurality of registration servers,
prompt the customer for a username and a password,
present a domain name reservation form to the customer in response to receipt of the username and the password from the customer,
present a cost summary, a request for payment and a legal agreement to the customer in response to receipt of a completed domain name reservation form from the customer, and
reserve the domain name in response to receipt of payment information and an acceptance of the legal agreement from the customer.

8. The system of claim 7, wherein the domain name reservation form includes account holder information, contact information and account password information.

9. The system of claim 7, wherein the each of the plurality of registration servers is further adapted to:
prompt the customer for an NIC handle in response to receipt of a domain name registration request from the customer;
present a domain name registration agreement template to the customer in response to receipt of the NIC handle from the customer;
present a cost summary, a request for payment and a legal agreement to the customer in response to receipt of a completed domain name registration agreement from the customer;
send a first electronic mail message, including the completed domain name registration agreement, to the customer in response to receipt of payment information and an acceptance of the legal agreement from the customer; and register the domain name in response to receipt of a second electronic mail message, including a verified domain name registration agreement, from the customer.

10. The system of claim 9, wherein the domain name registration agreement template includes registrant information, administrative contact information, technical contact information and billing contact information.

11. The system of claim 10, wherein the completed domain name registration agreement includes a customer electronic mail address and name server information.

* * * * *